US009982790B1

(12) United States Patent
Saunders et al.

(10) Patent No.: US 9,982,790 B1
(45) Date of Patent: May 29, 2018

(54) ROTARY HYDRAULIC VALVE

(71) Applicant: Google Inc., Mountain View, CA (US)

(72) Inventors: John Aaron Saunders, Arlington, MA (US); Steve Potter, Bedford, MA (US); Haink Tu, Waltham, MA (US); Zachary Jackowski, Somerville, MA (US); Alex Khripin, Cambridge, MA (US)

(73) Assignee: Boston Dynamics, Inc., Waltham, MA (US)

( * ) Notice: Subject to any disclaimer, the term of this patent is extended or adjusted under 35 U.S.C. 154(b) by 543 days.

(21) Appl. No.: 14/587,822

(22) Filed: Dec. 31, 2014

Related U.S. Application Data

(60) Provisional application No. 62/027,563, filed on Jul. 22, 2014.

(51) Int. Cl.
F16K 11/085 (2006.01)
F16K 11/083 (2006.01)
F16K 31/04 (2006.01)

(52) U.S. Cl.
CPC ........ F16K 11/0833 (2013.01); F16K 31/042 (2013.01); Y10T 137/86654 (2015.04); Y10T 137/87298 (2015.04)

(58) Field of Classification Search
CPC ............. F16K 11/0833; F16K 11/0836; F16K 11/083; F16K 11/085; F16K 11/0853; F16K 11/0856; F16K 31/042; F16K 31/041; Y10T 137/86549; Y10T 137/86558; Y10T 137/86566; Y10T 137/86638; Y10T 137/86654; Y10T 137/86823; Y10T 137/86622; Y10T 137/86702; Y10T 137/87129; Y10T 137/87298

USPC ........... 137/625.17, 625.21, 625.23, 625.65, 137/625.68, 599.05, 637.3; 251/209, 309, 251/310; 91/467, 519, 533
See application file for complete search history.

(56) References Cited

U.S. PATENT DOCUMENTS 3,587,646 A 6/1971 Adams
3,700,004 A 10/1972 Tobias
4,084,618 A * 4/1978 Gurries ................. F16K 27/041
137/625.48

(Continued)

FOREIGN PATENT DOCUMENTS

GB 2104249 3/1983
WO 2013120068 8/2013

Primary Examiner — Craig J Price
(74) Attorney, Agent, or Firm — Honigman Miller Schwartz and Cohn LLP

(57) ABSTRACT

Examples are provided that describe a rotary hydraulic valve. In one example, a rotary valve comprises a sleeve with a plurality of selector ports and one or more control ports spaced along a length of the sleeve. A spool comprising an internal chamber is provided within the sleeve. The spool includes a plurality of selector openings and one or more control openings spaced along a length of the spool. The rotary valve also comprises a controller for determining a given rotational movement of the spool based on a selection of a pressurized fluid. The rotary valve also comprises a motor coupled to the spool and for rotating the spool within the sleeve based on the given rotational movement. The motor is configured to cause a given alignment of the spool to the sleeve resulting in a pathway through the internal chamber of the spool and out to the sleeve.

18 Claims, 20 Drawing Sheets

(56) References Cited

U.S. PATENT DOCUMENTS

| | | | |
|---|---|---|---|
| 5,467,800 A * | 11/1995 | Sallas | F15B 21/125 |
| | | | 137/624.13 |
| 5,879,137 A | 3/1999 | Yie | |
| 6,269,838 B1 | 8/2001 | Woodworth et al. | |
| 6,594,992 B1 * | 7/2003 | Naito | F15B 11/17 |
| | | | 137/625.17 |
| 6,826,998 B2 * | 12/2004 | Pinot | F15B 9/09 |
| | | | 137/625.65 |
| 8,286,939 B2 | 10/2012 | Li et al. | |
| 8,584,791 B2 | 11/2013 | Sakamaki et al. | |
| 9,435,446 B1 * | 9/2016 | Saunders | F16K 11/06 |
| 9,494,246 B1 * | 11/2016 | Potter | F16K 31/04 |
| 9,611,946 B1 * | 4/2017 | Potter | F16K 11/0856 |
| 9,665,099 B1 * | 5/2017 | Saunders | G05D 1/021 |

\* cited by examiner

ROTARY HYDRAULIC VALVE

CROSS-REFERENCE TO RELATED APPLICATION

This application claims priority to U.S. Provisional Patent Application Ser. No. 62/027,563, filed on Jul. 22, 2014, the entirety of which is herein incorporated by reference.

GOVERNMENT LICENSE RIGHTS

This invention was made with government support under Contract No. W31P4Q-13-C-0107 awarded by the Defense Advanced Research Projects Agency. The government has certain rights in the invention.

BACKGROUND

Unless otherwise indicated herein, the materials described in this section are not prior art to the claims in this application and are not admitted to be prior art by inclusion in this section.

One of the ways that hydraulic machines are capable of performing work is through use of pressurized fluids. Pressurized fluids may be transmitted throughout the machine to various hydraulic motors. Hydraulic machinery has reached wide scale use due to the large power that can be transferred in the form of pressurized fluids and the large availability of actuators that can make use of the power.

Control is needed in order to operate hydraulic machinery in an effective manner. As an example, one way control is provided is through the use of valves. The ability to select between various pressurized fluids may be achieved through the use of a valve. This allows a passageway to be created that enables a pressurized fluid to flow from a source to an actuator that is responsible for moving a component of a hydraulic machine.

SUMMARY

In one example, a rotary valve is provided comprising a sleeve with a plurality of selector ports and one or more control ports spaced along a length of the sleeve. The plurality of selector ports are arranged to be assigned to sequentially increasing pressurized fluid based on a plurality of axial positions. A spool is provided within the sleeve. The spool comprises an internal chamber. The spool comprises a plurality of selector openings and one or more control openings spaced along a length of the spool, wherein the plurality of selector openings and the one or more control openings provide access to the internal chamber. The one or more selector openings of the plurality of selector openings correspond to one or more selector ports of the plurality of selectors ports according to a given axial position of the sleeve. The rotary valve comprises a controller for determining a given rotation movement of the spool based on a selection of a given pressurized fluid associated with the given axial position of the sleeve. The given rotational movement comprises rotations in a clockwise or counterclockwise direction that result in a selection of a sequentially higher or lower pressurized fluid. The rotary valve comprises a motor coupled to the spool and for rotating the spool within the sleeve based on the given rotational movement. The given rotational movement will cause a given alignment of the spool to the sleeve resulting in at least a partial overlap between at least one of the plurality of selector openings and at least one of the plurality of selector ports. The partial overlap creates a pathway through the internal chamber of the spool and out to the sleeve.

In another example, a valve is provided comprising a spool with an internal chamber. The spool comprises a plurality of selector openings and one or more control openings along an external surface of the spool positioned according to a longitudinal axis of the spool. The valve comprises a sleeve configured to receive the spool. The sleeve comprises a plurality of selector ports and one or more control ports positioned at different heights along a longitudinal axis of the sleeve. The plurality of selector ports are arranged to be assigned to sequentially increasing pressurized fluid based on a plurality of axial positions. A given selector port of the plurality of selector ports is configured to couple to a given selector opening of the plurality of selector openings of the spool based on a corresponding height between the given selector port and the given selector opening. The valve comprises an encoder coupled to the spool and configured to determine information indicative of a relative position of the spool within the sleeve. A controller configured to determine a given rotational movement of the spool within the sleeve based on a selection of a pressurized fluid associated with the given selector port and the information indicative of the relative position of the spool within the sleeve. The valve comprises a motor coupled to the spool. The motor is configured to rotate the spool within the sleeve based on the given rotational movement.

In another example, a rotary valve comprises a spool. The spool includes a plurality of internal chambers and a plurality of selector openings along an external surface. The plurality of selector openings are configured to allow a pressurized fluid of a plurality of pressurized fluids to flow through a given internal chamber of the plurality of internal chambers. The rotary valve comprises a sleeve. The sleeve comprises a plurality of selector ports. The sleeve is configured for receiving the spool. The plurality of selector ports are arranged to be assigned to sequentially decreasing pressurized fluid based on a plurality of axial positions. The rotary valve comprise position sense magnet coupled to the spool. The rotary valve comprises a sensor configured to provide information indicative of a relative position of the spool within the sleeve based on a magnetic field of the position sense magnet. The rotary valve comprises a controller configured to receive the information indicative of the relative position of the spool within the sleeve and to determine a given rotational movement of the spool within the sleeve. The given rotational movement of the spool within the sleeve is based on a selection of one of the plurality of pressurized fluids and the relative position of the spool within the sleeve. The rotary valve comprises a stator assembly coupled to the sleeve. The rotary valve comprises a rotor coupled to the spool. The rotor is configured to rotate the spool within the sleeve based on the given rotational movement and through the use of the stator assembly.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples described herein include subsystems that enable a hydraulic machine, including a rotary valve, to enable selection of a pressurized fluid. The rotary valve may include a sleeve with a plurality of selector ports and one or more control ports spaced along a length of the sleeve. The plurality of selector ports are arranged to be assigned to sequentially increasing pressurized fluid based on a plurality of axial positions. The rotary valve may include a spool that is provided within the sleeve. The spool may comprise an internal chamber. The spool may include a plurality of selector openings and one or more control openings spaced along a length of the spool. The plurality of selector openings and the one or more control openings provide access to the internal chamber. The one or more selector openings of the plurality of selector openings correspond to one or more selector ports of the plurality of selector ports according to a given axial position of the sleeve. The rotary valve may include a controller for determining a given rotational movement of the spool based on a selection of a given pressurized fluid associated with the given axial position of the sleeve. The given rotational movement comprises rotation in a clockwise or counter-clockwise direction. The rotary valve may include a motor coupled to the spool. The motor may be configured for rotating the spool within the sleeve based on the given rotational movement to cause a given alignment of the spool to the sleeve that results in at least a partial overlap between at least one of the plurality of selector openings and at least one of the plurality of selector ports. The partial overlap creates a pathway through the internal chamber of the spool and out to the sleeve.

Figure 1A:
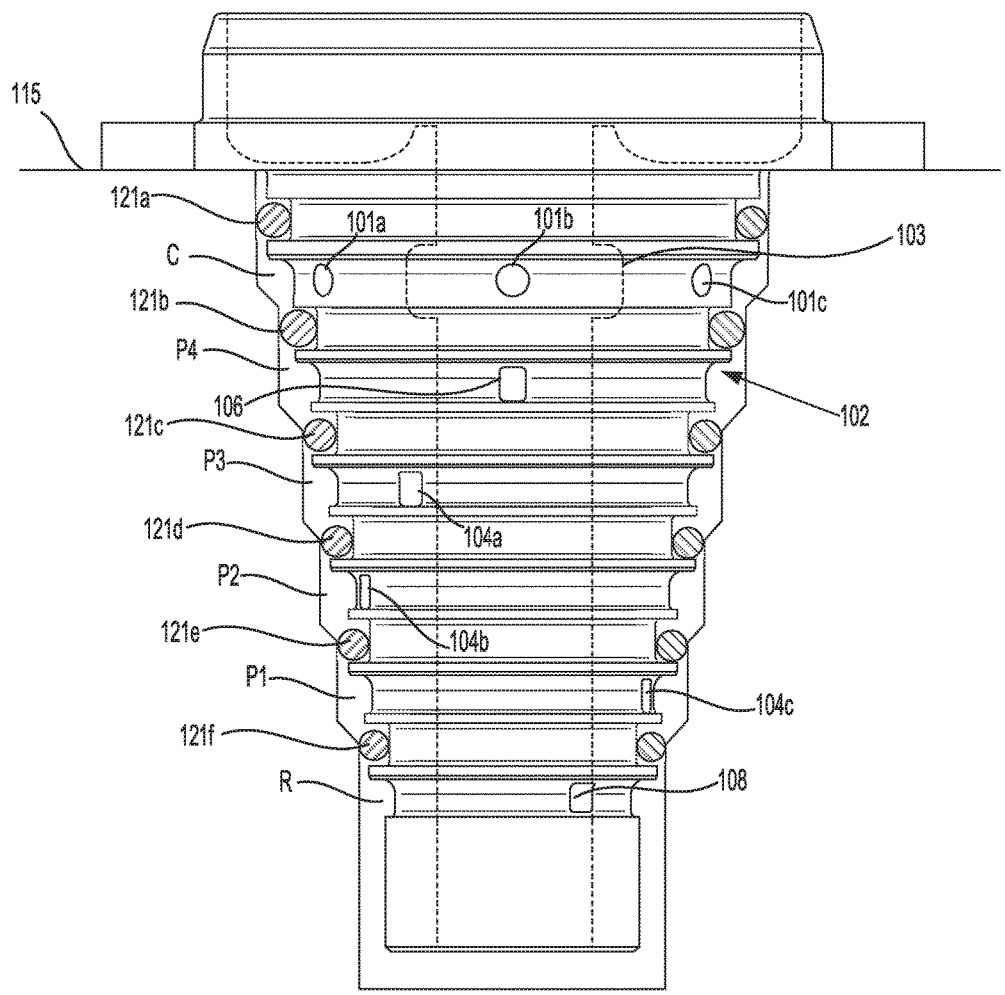
FIG. 1A illustrates a side view of a sleeve inserted in a manifold.

Referring now to the figures, FIG. 1A illustrates a side view of a sleeve 102 of an example rotary valve inserted into manifold 115. The sleeve 102 comprises selector ports 104a, 104b, 104c 106, and 108 configured as through-holes in a spiral configuration along a length of the sleeve 102. The selector ports 104a, 104b, 104c, 106, 108 include an upper selector port 106, a lower selector port 108, and one or more selector ports 104a, 104b, and 104c between the upper selector port 106 and the lower selector port 108. The sleeve 102 comprises a control port 103, communicating with one or more control output holes 101a, 101b, and 101c. The sleeve 102 comprises a plurality of seals 121a, 121b, 121c, 121d, 121e, 121f that define a plurality of channels labeled C, P4, P3, P2, P1, and R. For instance, seals 121a and 121b define a channel labeled as C between the two seals 121a-b. In other words, an area between the two seals 121a-b is a channel or passageway within which fluid may flow.

By way of example, C is an output, and R, P1, P2, P3, and P4 are inputs. Control output holes 101a, 101b, and 101c connect to output C, selector port 106 connects to input P4, selector port 108 to input R, and selector ports 104a, 104b, and 104c connect to inputs P3, P2, and P1 respectively. Rotation of the spool (not shown) selectively creates a pathway between channel C to a given channel of the plurality of channels associated with a given input.

In one example, the selector ports 104a, 104b, 104c, 106, and 108 may serve as inputs and may be coupled to a plurality of pressurized fluids. The plurality of pressurized fluids may comprise a plurality of pressurized fluids at various pressure levels. In another example, the plurality of pressurized fluids may comprise a plurality of pressure levels at 3000 psi, 2250 psi, 1500 psi, 750 psi, and 100 psi, (e.g. connected to P4, P3, P2, P1, and R respectively) among others. The plurality of pressure levels may be configured as needed based on a specific application associated with a hydraulic machine. In one example, the plurality of pressure levels are configured to connect an output to sequentially higher pressure inputs as a spool is rotated.

The selector ports 104a, 104b, 104c, 106, and 108 may be machined into the sleeve 102 and designed in various ways. In one example, the selector ports 104a, 104b, 104c, 106, and 108 may have a width of about 1.5 mm and a height of 1.8 mm. A port width of about 1.5 mm may enable a given amount of overlap to occur between a given opening of the example spool and a given port of the sleeve 102 based on a position of the example spool within the sleeve 102. The given amount of overlap between the given opening and the given port will enable a control in flow rate corresponding to the given pressurized fluid. By way of example, it may be possible to have more than one selector port at each axial location along the sleeve 102. Providing more than one selector port at each axial location may also be useful for the purpose of balancing radial forces.

Figure 1B:
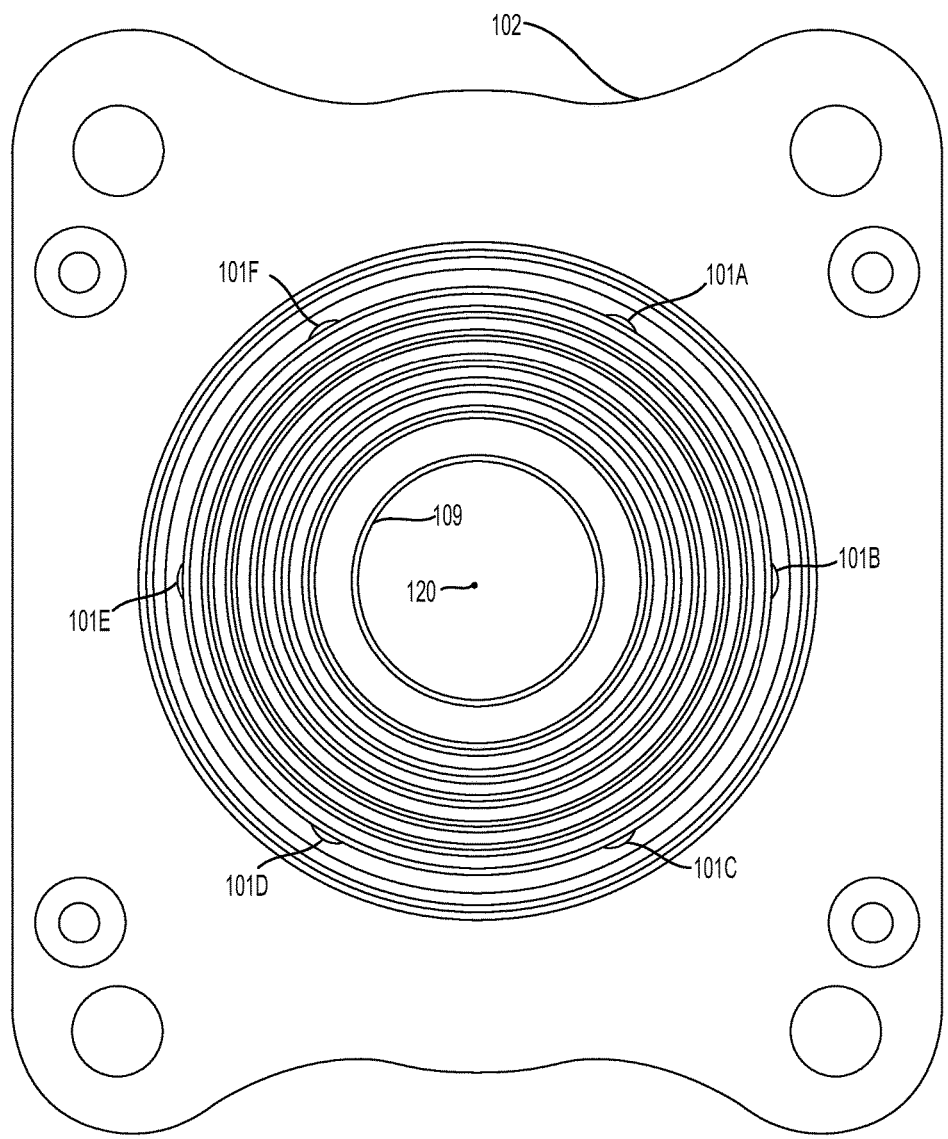
FIG. 1B illustrates a bottom view of the sleeve of FIG. 1A.

FIG. 1B illustrates a bottom view of the sleeve 102. The sleeve 102 comprises a sleeve bore 109 connecting with control output holes 101a, 101b, 101c, 101d, 101e, and 101f, and selector ports 104a, 104b, 104c, 106, and 108 (not shown). In this example, the selector ports 104a, 104b, 104c, 106, and 108 are aligned radially to an axis 120 of the sleeve 102. The sleeve bore 109 accepts a spool (not shown) which may fit in a manner that minimizes axial leakage between selector ports.

The sleeve 102 may comprise any number of materials that exhibit a certain hardness and resistance to abrasion. The sleeve 102 may be configured to resist deformation based on the pressure levels associated with the plurality of pressurized fluids. By way of example, the sleeve 102 may comprise a tool steel that is heat treated. In this example, a heat treating process on the tool steel will provide the sleeve 102 with a certain resistance to abrasion and deformation.

In another example, the sleeve 102 may comprise an overall height of about 54 mm with an outside diameter of about 35 mm. The sleeve 102 may comprise an internal diameter of about 9.8 mm for receiving an example spool with a diameter slightly smaller than 9.8 mm.

Figure 1C:
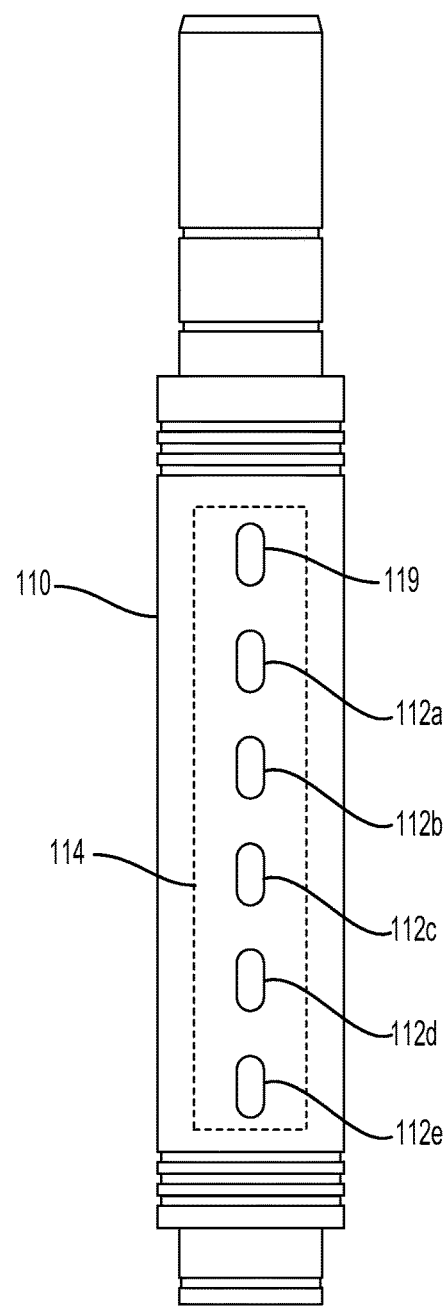
FIG. 1C illustrates a side view of an example spool.

FIG. 1C illustrates an example side view of a spool 110. The spool 110 may be inserted into the sleeve 102. The spool 110 includes an internal chamber 114, at least one control opening 119, and a plurality of selector openings 112a, 112b, 112c, 112d, and 112e as shown in FIG. 1C. The plurality of selector openings 112a, 112b, 112c, 112d, and 112e may be configured to allow a pressurized fluid to access the internal chamber 114. The control opening 119 may allow fluid access from the control port 103 to the internal chamber 114.

The spool 110 may comprise any number of materials that exhibit a certain hardness and resistance to abrasion. Similar to the sleeve 102, the spool 110 may be configured to resist deformation based on the pressure levels associated with the plurality of pressurized fluids. In one example, the spool 110 may comprise a tool steel that is heat treated. In this example, a heat treating process on the tool steel will provide the spool 110 with a certain resistance to abrasion and deformation.

In another example, the spool 110 may comprise an overall length of about 68 mm with an outside diameter of about 9.8 mm. With an overall length of about 68 mm, the plurality of selector openings 112 may be axially spaced apart about 5.75 mm (center-to-center) from each other. Other examples are possible as well, and dimensions provided herein are for illustration only.

Figure 1D:
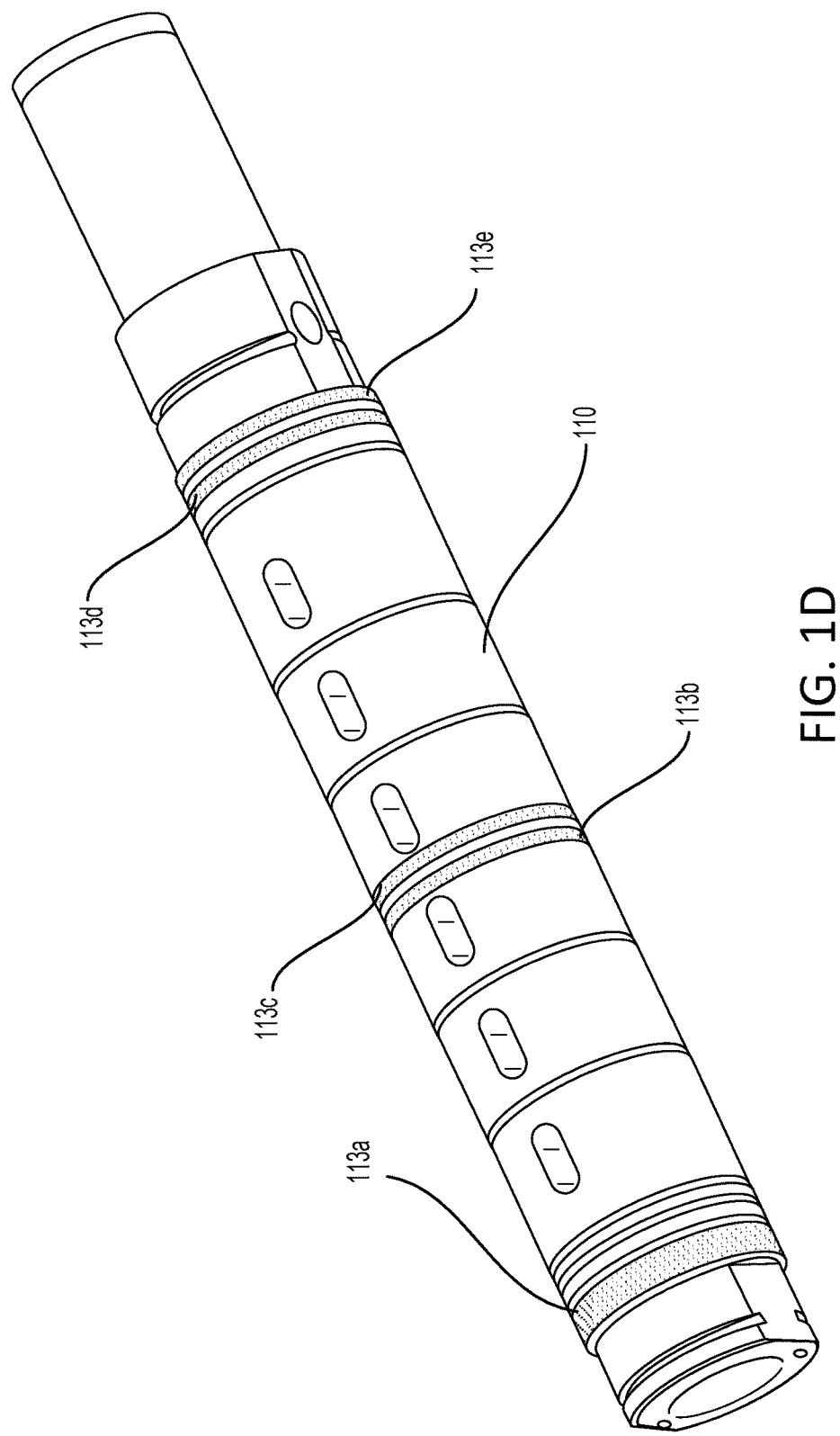
FIG. 1D illustrates a perspective view of another spool.

FIG. 1D illustrates a perspective view of the spool 110. In one example, the spool 110 may comprise a plurality of ribs 113a, 113b, 113c, 113d, and 113e positioned along an external surface of the spool 110 as shown in FIG. 1D. The plurality of ribs 113a, 113b, 113c, 113d, and 113e may serve to maintain a separation between the spool 110 and the sleeve 102. By way of example, limiting the eccentricity of the spool 110 within the sleeve 102 provides a pressure distribution that is more symmetric on either side of the spool 110, thus minimizing radial forces and friction between the sleeve 102 and the spool 110.

In one example, the plurality of ribs 113a, 113b, 113c, 113d, and 113e may comprises a radial thickness of about 3 microns and an axial length of about 0.5 mm to 2 mm. In this example, the plurality of ribs 113a, 113b, 113c, 113d, and 113e may be configured to reduce friction between the spool 110 and the sleeve 102 resulting from a pressure force associated with a given pressurized fluid of the plurality of pressurized fluids. For instance, the friction may be reduced by maintaining an average radial clearance of about 1 micron between the plurality of ribs 113a, 113b, 113c, 113d, and 113e and the sleeve 102 and an average radial clearance of about 4 microns between the remainder of the external surface of the spool 110 and the sleeve 102. Other clearances are possible as well, and the ribs 113a, 113b, 113c, 113d, and 113e can be configured to provide more or less spacing as desired. In one example, the plurality of ribs 113a, 113b, 113c, 113d, and 113e may be coated with a diamond-like carbon (DLC) material comprising amorphous carbon. In this example, the use of DLC could serve to reduce friction between the spool 110 and the sleeve 102.

The plurality of ribs 113a, 113b, 113c, 113d, and 113e may be created on the spool 110 in a number of different ways. One exemplary method of creating the plurality of ribs 113a, 113b, 113c, 113d, and 113e comprises lapping the spool 110 and the sleeve 100 to produce the desired fit at the plurality of ribs 113a, 113b, 113c, 113d, and 113e. In this example, an etching process may be used to reduce an outer diameter of the spool 110 between the plurality of ribs 113a, 113b, 113c, 113d, and 113e. Another exemplary method of creating the plurality of ribs 113a, 113b, 113c, 113d, and 113e may comprise a process of grinding down the spool 110 by a given amount throughout the external surface of the spool 110 other than the desired locations for the plurality of ribs 113a, 113b, 113c, 113d, and 113e.

Figure 1E:
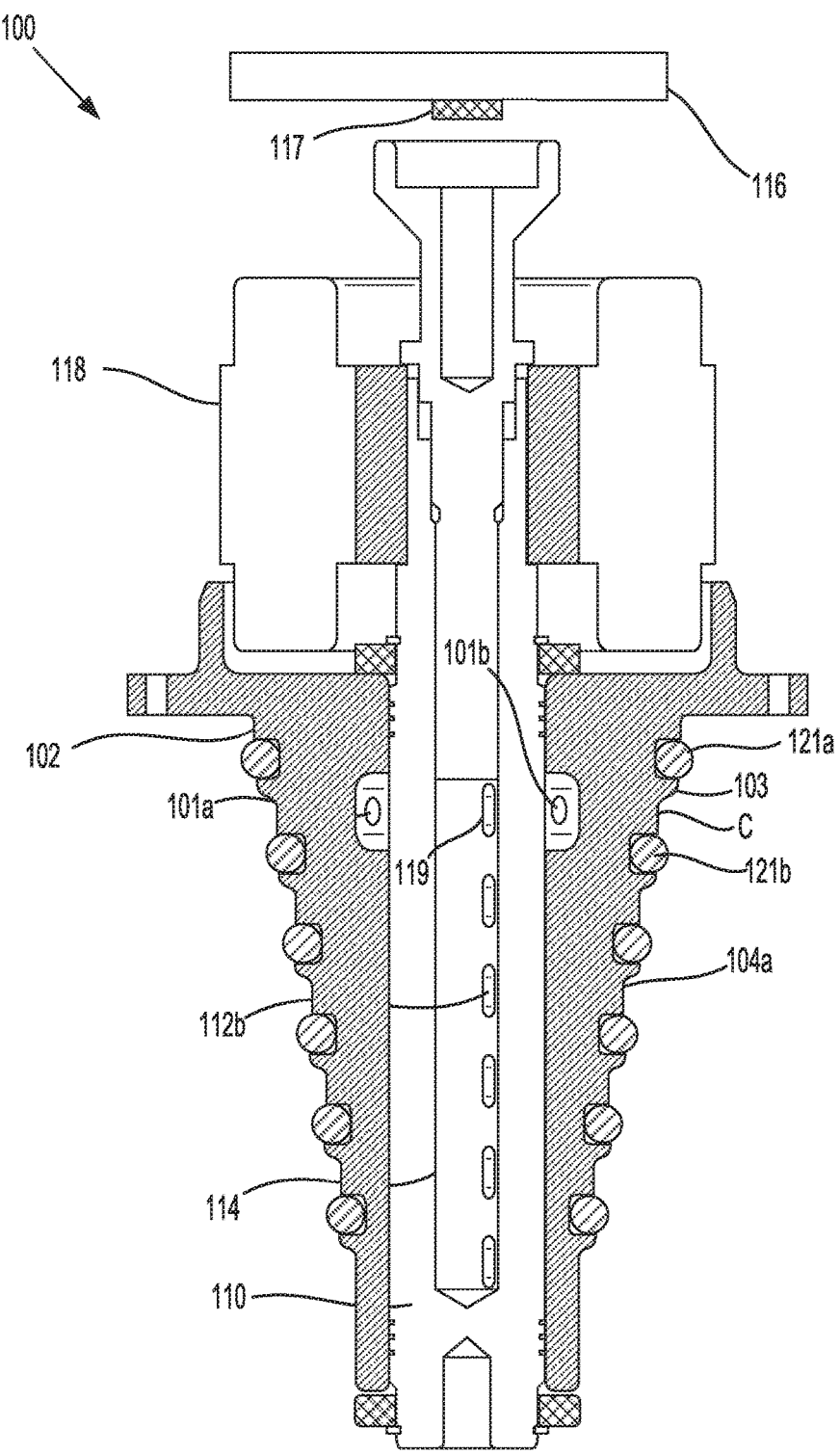
FIG. 1E illustrates a cross-sectional view of an example rotary valve.

FIG. 1E illustrates a cross-sectional view of the rotary valve 100. The spool 110 is provided within the sleeve 102. The plurality of selector openings 112a, 112b, 112c, 112d, and 112e may be configured to provide access to a given selector port 104a of the sleeve 102. A controller 116 for determining a given rotational movement of the spool 110 is shown. A sensor 117 is configured to provide information indicative of a rotational position of the spool 110 within the sleeve 102 as shown in FIG. 1E. A motor 118 is coupled to the spool 110 as shown in FIG. 1E.

In one example, the controller 116 may be configured to determine the given rotational movement of the spool 110 based on a selection of a pressurized fluid. The rotational movement may permit a given pressurized fluid associated with a given selector port 104a of the sleeve 102 to be selected.

In one example, the sensor 117 may be configured as an absolute encoder. The absolute encoder would allow the position of the spool 110 to be made available to the controller 116 in order to determine the given rotational movement. Any number of rotary encoders may be used as the sensor 117.

In one example, the motor 118 is configured for rotating the spool 110 within the sleeve 102 based on the given rotational movement. The given rotational movement may be applied to the spool 110 to cause a given alignment of the spool 110 to the sleeve 102 that results in a pathway from given selector port 104a, through given selector opening 112b, through internal chamber 114 of spool 110, control opening 119, control port 103 and output holes 101a and 101b to output C.

Figure 1F:
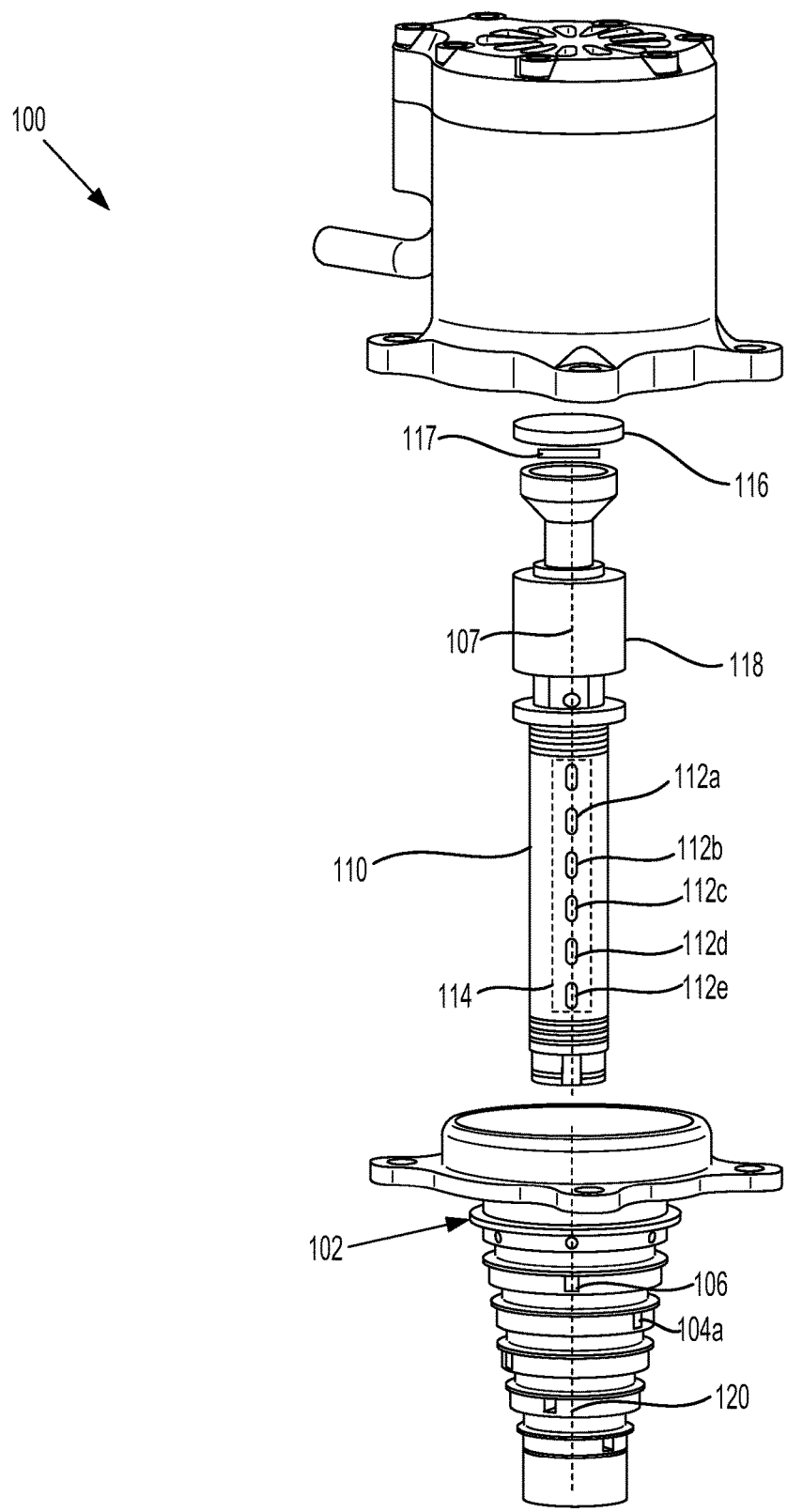
FIG. 1F illustrates an exploded view of an example valve.

FIG. 1F illustrates an exploded view of an example valve 100. The valve 100 comprises a spool 110. As is shown in FIG. 1F, the valve 100 includes a sleeve 102 configured to receive the spool 110. The valve 100 includes a sensor 117. The valve 100 includes a controller 116. The valve 100 includes a motor 118 coupled to the spool 110.

In one example, the spool 110 includes an internal chamber 114. The spool 110 includes a plurality of selector openings 112a, 112b, 112c, 112d, and 112e along an external surface of the spool 110 positioned in a vertical arrangement along a longitudinal axis 107 of the spool 110.

By way of example, the sleeve 102 comprises a plurality of selector ports 104a and 106 positioned at different heights along a longitudinal axis 120 of the sleeve 102 and spaced in a helical manner. A given selector port 106 of the plurality of selector ports 104a, 104b, 104c, 106, and 108 may be configured to couple to a given selector opening 112a of the plurality of selector openings 112a, 112b, 112c, 112d, and 112e of the spool 110 based on a corresponding height between the given selector port 106 and the given selector opening 112a. In one example, the plurality of selector openings are staggered about 90° according to axial positions of the plurality of selector openings.

The sensor 117 may be configured to determine information indicative of a relative position of the spool 110 within the sleeve 102. In one example, the sensor 117 may also be configured to determine information indicative of an absolute position of the spool 110 within the sleeve 102.

By way of example, the controller 116 is configured to determine a given rotational movement of the spool 110 within the sleeve 102. The given rotational movement may be based on the information indicative of the relative position of the spool 110 within the sleeve 102. The given rotational movement includes a minimal rotational movement to cause at least a portion of the given selector opening 112a to overlap the given selector port 106 at the corresponding height between the given selector port 106 and the given selector opening 112a.

Referring to FIG. 1F, the motor 118 is configured to rotate the spool 110 within the sleeve 102 based on the given rotational movement so as to enable a selection of a pressurized fluid associated with the given selector port 106. In one example, the motor 118 may comprise a brushless DC motor. The brushless DC motor may be driven through sinusoidal commutation in order to achieve smooth torque control. Smooth torque control may enable the brushless DC motor to rotate the spool 110 at low speeds and enable metering of the plurality of pressurized fluids in an effective manner, for example.

Figure 1G:
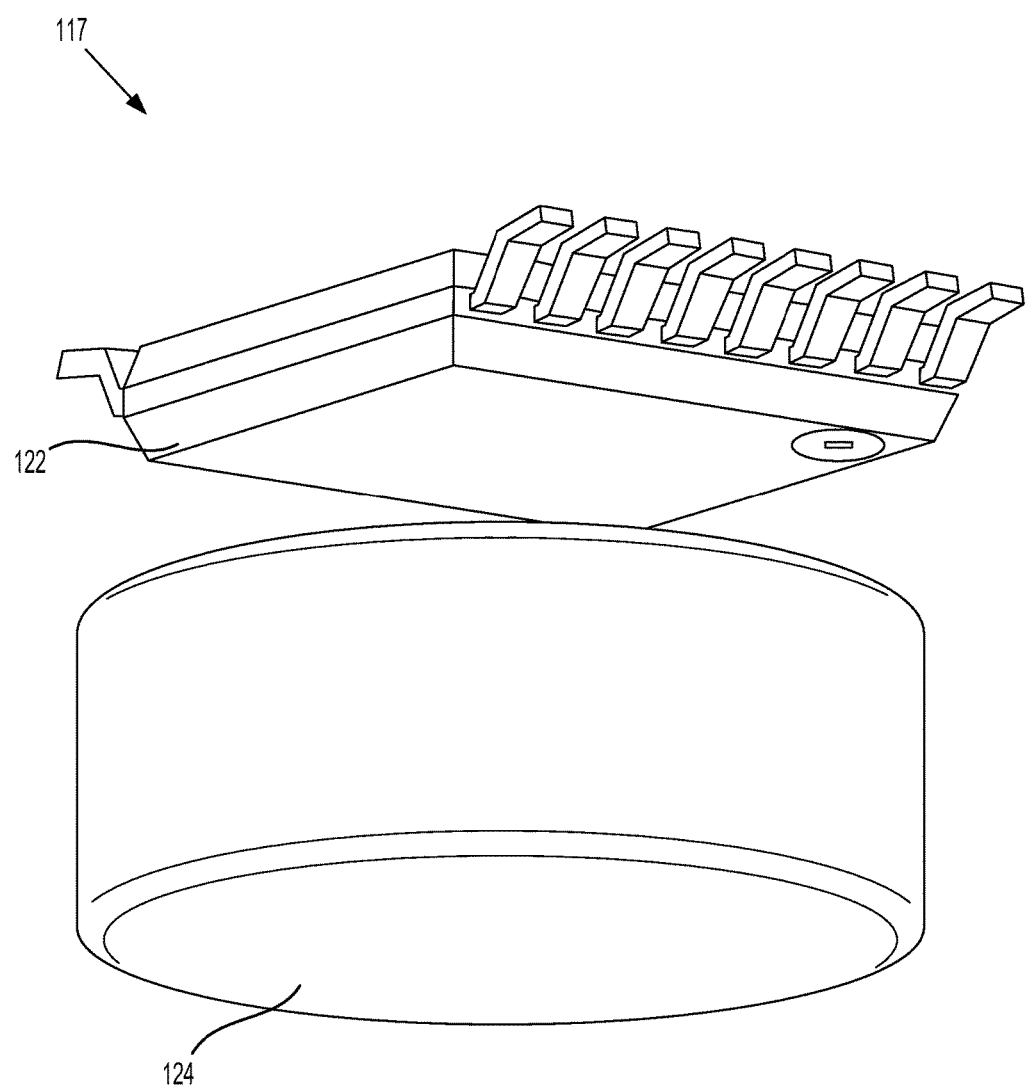
FIG. 1G illustrates a sensor associated with an example valve.

FIG. 1G illustrates the sensor 117 associated with valve 100. Referring to FIG. 1G, the sensor 117 may comprise a magnetic rotary encoder 122. In one example, the magnetic rotary encoder 122 may be configured above a magnet 124 and configured to determine a position of the spool 110 based on a magnetic field associated with the magnet 124. In another example, the magnet 124 may have a width of about 9 mm and a height of 3 mm. In this example, the magnetic rotary encoder 122 may be positioned about 1.3 mm away from the magnet 124 in order to measure the magnetic field associated with the magnet 124.

FIGS. 1H-1K illustrate different stages of operation of an example rotary valve. A two-dimensional map of an unrolled port layout based on a cross-section of the sleeve 102 of FIG. 1A and the internal chamber 114 of FIG. 1C is shown in FIGS. 1H-1K.

Figure 1H:
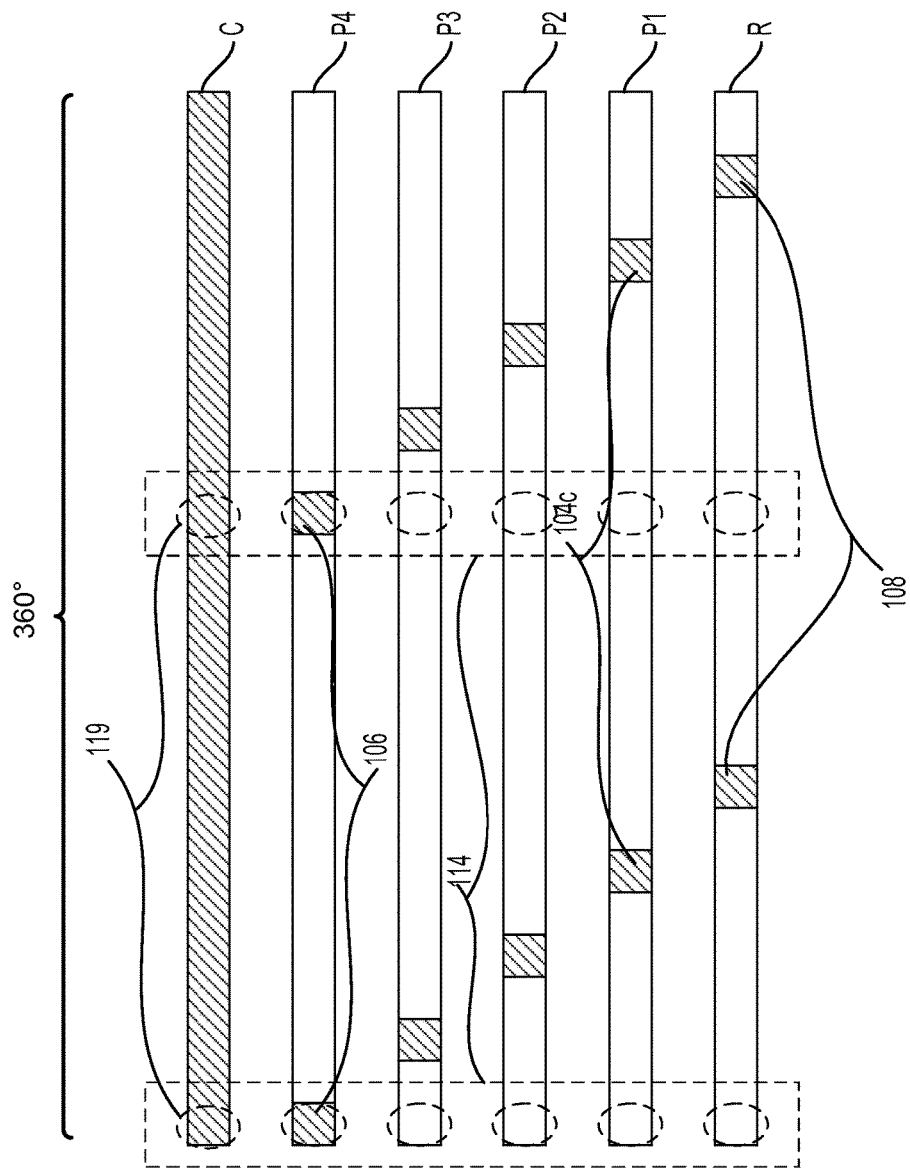
FIGS. 1H-1K illustrate different stages of operation of an example rotary valve.

Referring to FIG. 1H, the selector openings of the spool 110 are arranged vertically and communicate with a single internal chamber 114. Control opening 119 connects to the "output" or control port 103 of the valve 100. The control port 103 may be connected to a hydraulic actuator. In this example, the plurality of selector ports 104a, 104b, 104c, 106, and 108 of the sleeve 102 are arranged in a spiral and configured with pressures ascending vertically. In this two-dimensional map, rotational movement of the spool 110 is represented as left or right movement of the dotted lines. As the spool 110 moves, the control port 103 connects sequentially to the next higher or lower pressure rail. For instance, in FIG. 1H the fourth pressure rail (P4) is selected.

Figure 1I:
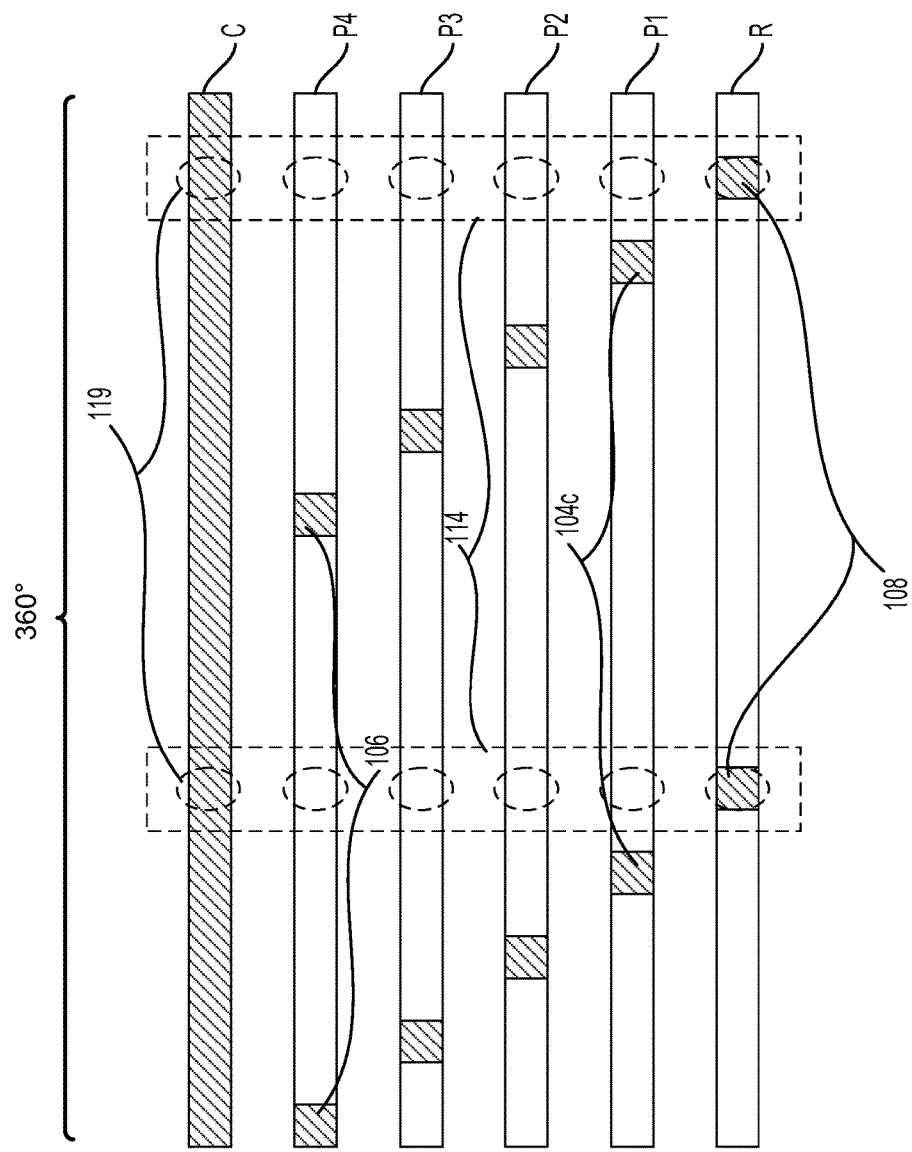

FIG. 1I shows an example position of the spool 110 within the sleeve 102 according to the port layout for valve 100 of FIGS. 1A-1G unrolled to make a two-dimensional map. By way of example, the spool 110 has rotated to provide alignment with selector port 108 of the valve 100. In this example, the lowest pressure (R) is selected.

Figure 1J:
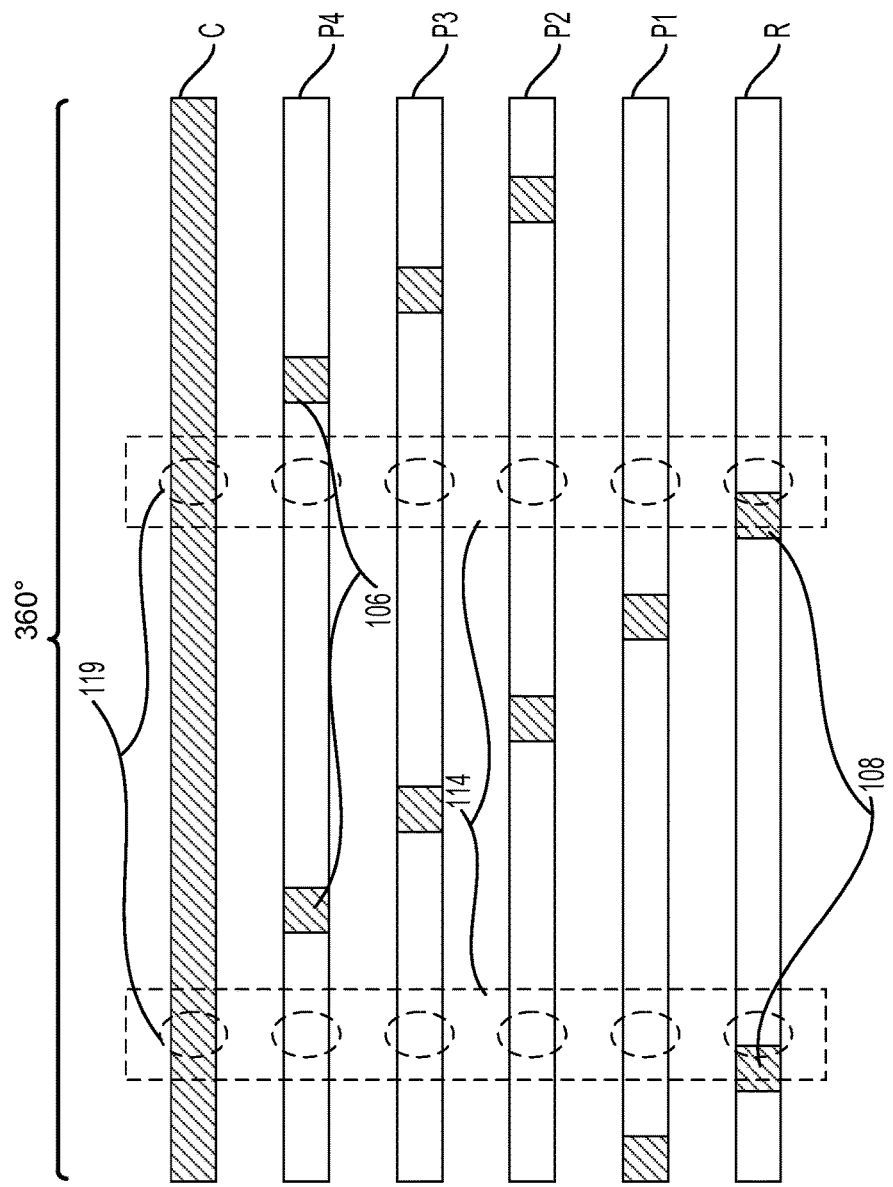

Referring to FIG. 1J, the valve 100 of FIG. 1F may be capable of a wrap-around mode in which a small movement of the spool can change the selected pressure from the highest (P4) pressure rail to the lowest (R) pressure rail. For instance, in FIG. 1J the output port C is shown metering to return (R). The wrap-around mode is useful for high-bandwidth force control of a hydraulic actuator.

By way of example, a continuous wrap-around rotation of the spool within the sleeve may be used in order to transition alignment between a selector opening and a selector port. Alignment of a given selector opening between a first selector port associated with a highest pressurized fluid may be changed to a second selector port associated with a lowest pressurized fluid. In another example, the continuous wrap-around rotation may be used to transition alignment of the given selector opening of the spool between a first selector port associated with a lowest pressurized fluid to a second selector port associated with a highest pressurized fluid.

Figure 1K:
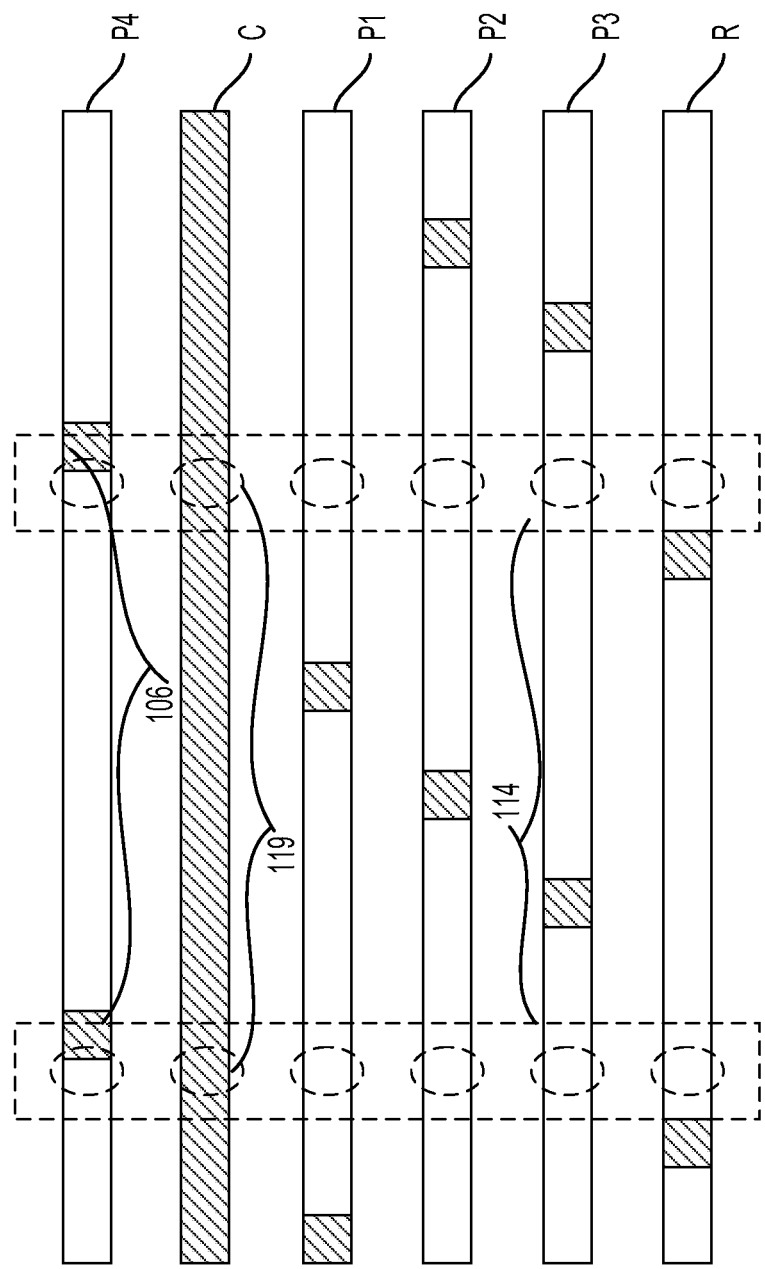

Referring to FIG. 1K, the selector ports of the sleeve 102 and the selector openings of the spool 110 associated with supply pressures P1, P3, and P4 have been re-ordered along the axis of the valve 100 without changing the logic or function of the valve 100 of FIG. 1F. The layout of FIG. 1K allows the pressure levels to be selected sequentially and enables the high-bandwidth wrap-around mode. As shown in FIG. 1K, the valve 100 is shown metering selector port 106.

Figure 2A:
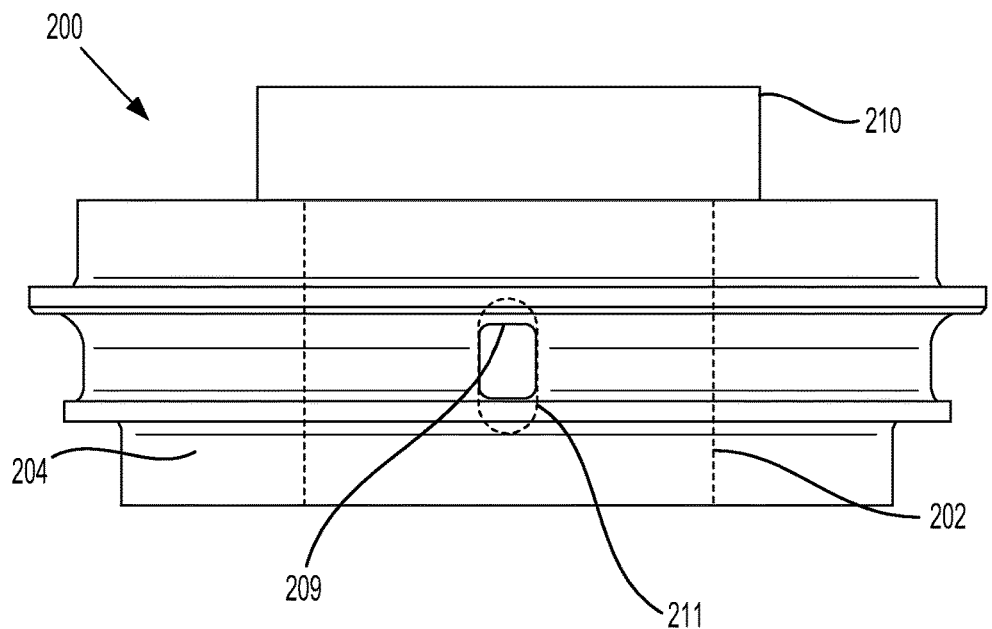
FIGS. 2A and 2B illustrate example side views associated with positions of a spool within a sleeve.
Figure 2B:
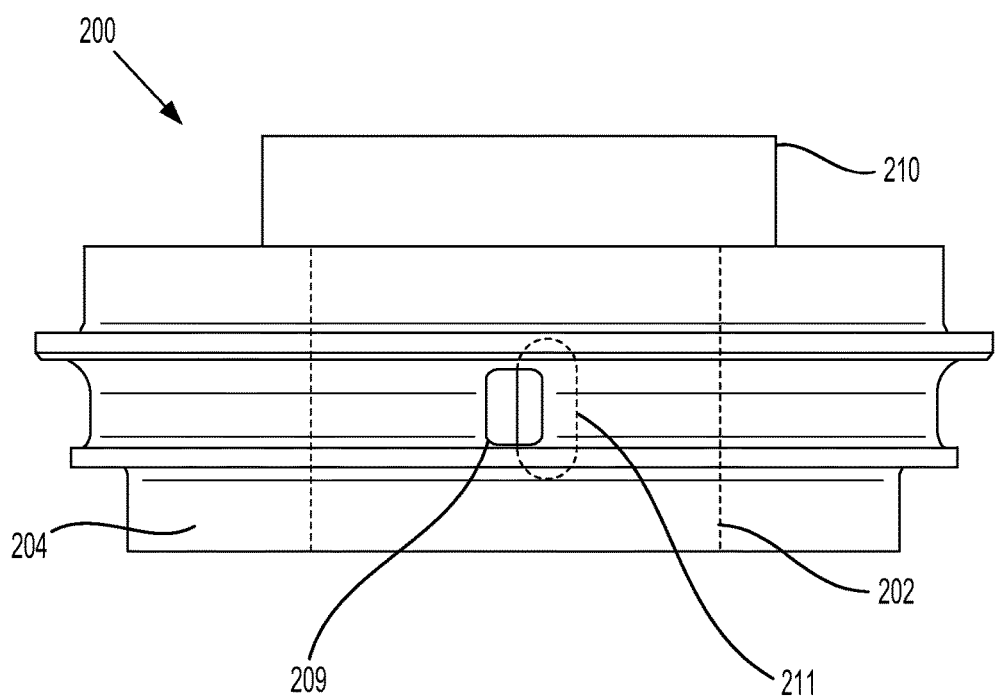

FIGS. 2A and 2B illustrate example side views associated with positions of the spool 202 within the sleeve 204. Referring to FIG. 2A, the actuator 210 may be configured to rotate the spool 202 to a given position and maintain the given position so that given selector opening 211 of the plurality of selector openings overlaps a given selector port 209 of the plurality of inlet and outlet selector ports for substantially full alignment of the given selector opening 211 to the given selector port 209. This given position will enable the pressurized fluid associated with the given selector port 209 to flow at a maximum rate associated with the pressurized fluid.

Referring to FIG. 2B, the actuator 210 may be configured to rotate the spool 202 to a given position and maintain the given position so that the given selector opening 211 of the plurality of selector openings partially overlaps a given selector port 209 of the plurality of inlet and outlet selector ports for metering of the pressurized fluid associated with the given selector port 209.

In one example, the actuator 210 may be configured to rotate the spool 202 based on the given rotational movement that includes a minimal amount of rotation in a clockwise or counter-clockwise direction. The minimal amount of rotation may be based on a shortest distance along the external surface between the given selector opening 211 of the plurality of selector openings 205 and the given selector port 209 of the plurality of inlet and outlet selector ports.

Figure 2D:
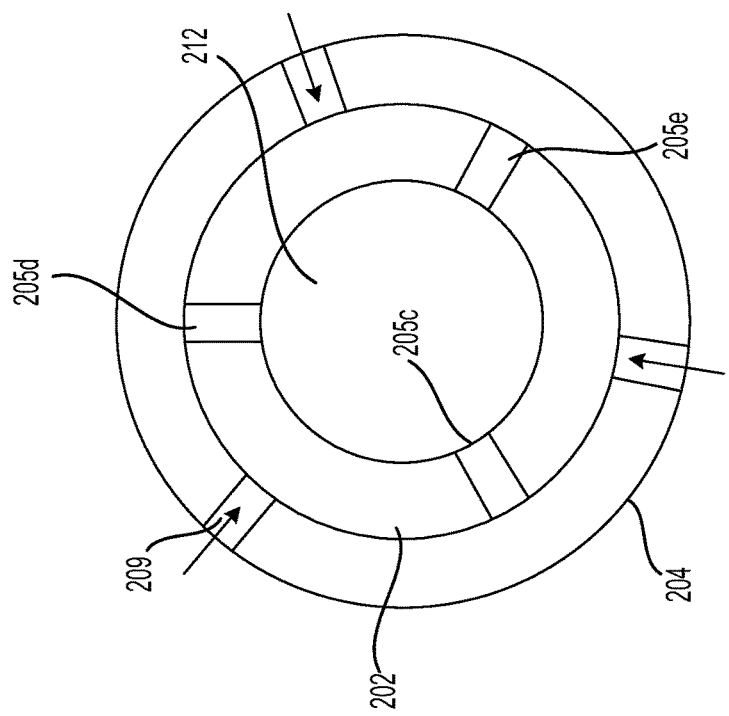
FIGS. 2C and 2D illustrate example cross-sectional views of another spool.
Figure 2C:
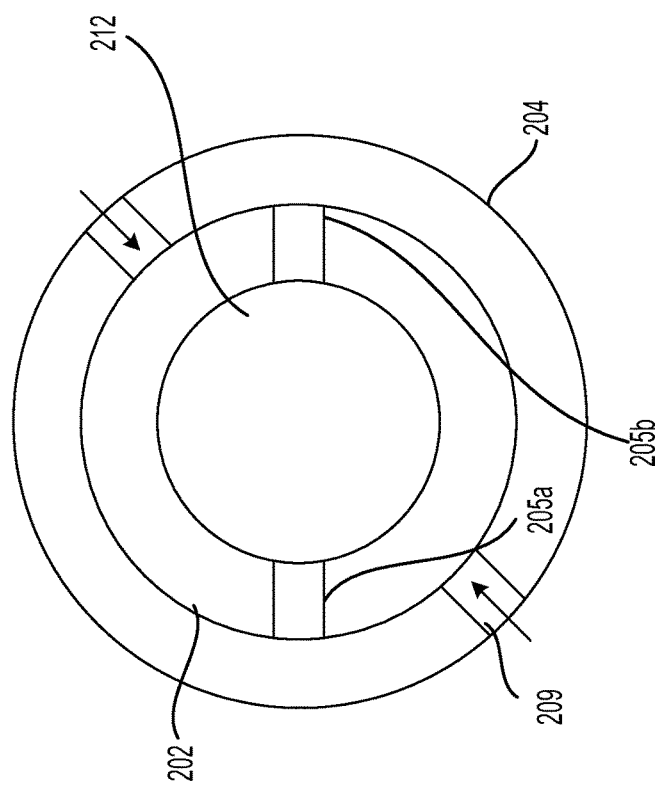

FIGS. 2C and 2D illustrate example cross-sectional views of the spool 202. Referring to FIG. 2C, in one example, the spool 202 comprises a plurality of selector openings 205a and 205b that are configured to provide access to the internal chamber 212 of the spool 202 at given heights along a longitudinal axis of the spool 202. The plurality of selector openings 205a and 205b are provided at offsets with respect to each other of about 180° along a circumference of the spool 202. In one example, the spool 202 may comprise a plurality of selector openings 205 that correspond to a plurality of selector ports of the sleeve 204 at each axial position. The plurality of selector ports and the plurality of selector openings 205a and 205b may be arranged in a configuration such as a circular array so as to minimize a radial force on the spool 202 due to a pressure imbalance.

Referring to FIG. 2D, in another example, the spool 202 comprises a plurality of selector openings 205c, 205d, and 205e that are configured to provide access to the internal chamber 212 at given heights along the longitudinal axis of the spool 202. The plurality of selector openings 205c, 205d, and 205e are provided at offsets with respect to each other of about 120° along a circumference of the spool 202. This arrangement may help to reduce an unintended net radial force of the spool 202 within the sleeve 204 due to a pressure imbalance within the sleeve 204 associated with a selection of a given pressurized fluid.

Figure 2F:
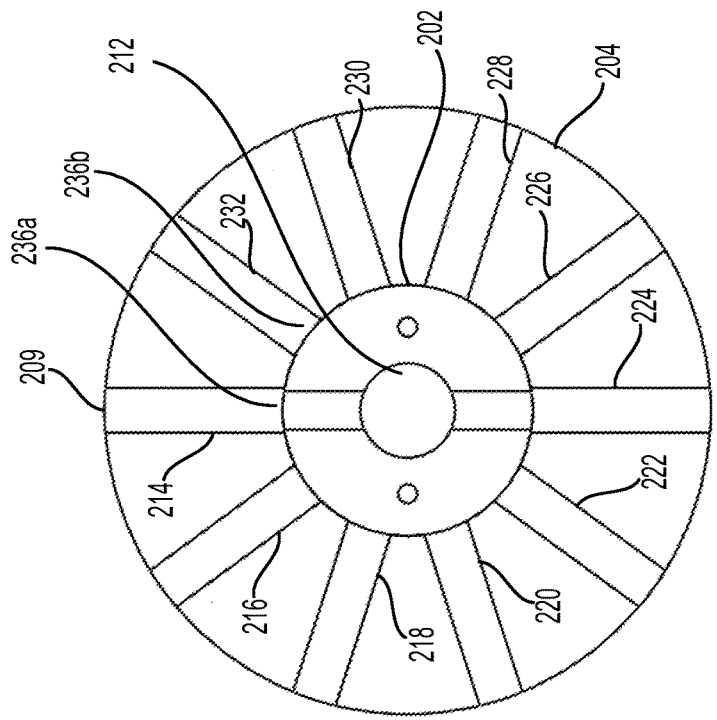
FIGS. 2E and 2F illustrate example cross-sectional views of another spool.
Figure 2E:
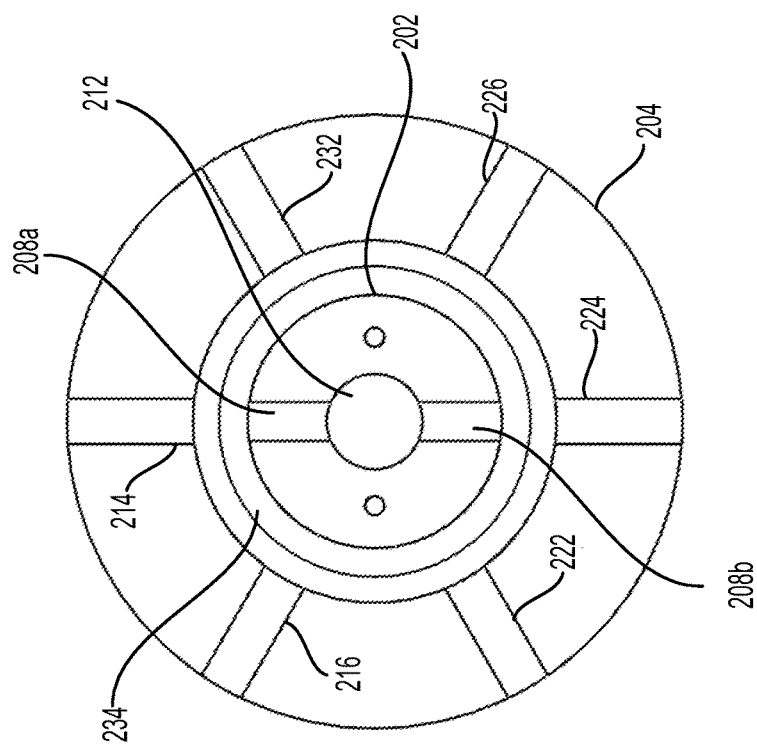

FIGS. 2E and 2F illustrate cross-sectional views of example spools. Referring to FIG. 2E, when the linear valve is used as a selector valve, it is desirable for the output to connect to the internal chamber 212 of the spool 202 at the same time that a given selector opening (not shown) of the spool 202 overlaps with a given selector port (not shown) of the sleeve 204. Referring to FIG. 2E, the control output holes 214, 216, 222, 224, 226, and 232 communicate with a control port 234 which is a 360° undercut in the sleeve 204. The control port 234 communicates with control openings 208a and 208b of the spool 202 regardless of rotation of the spool 202. In this example, the output connects to internal chamber 212 regardless of a given position associated with the spool 202.

FIG. 2F shows another example in which there is a plurality of control output holes 214, 216, 218, 220, 222, 224, 226, 228, 230, and 232 forming a plurality of control ports 236a and 236b at the sleeve 204. The plurality of control ports 236a and 236b are arranged so that output C connects to internal chamber 212 at an angle associated with the spool 202 as when a given selector port is selected (i.e. a given selector opening overlaps with a given selector port).

Figure 2G:
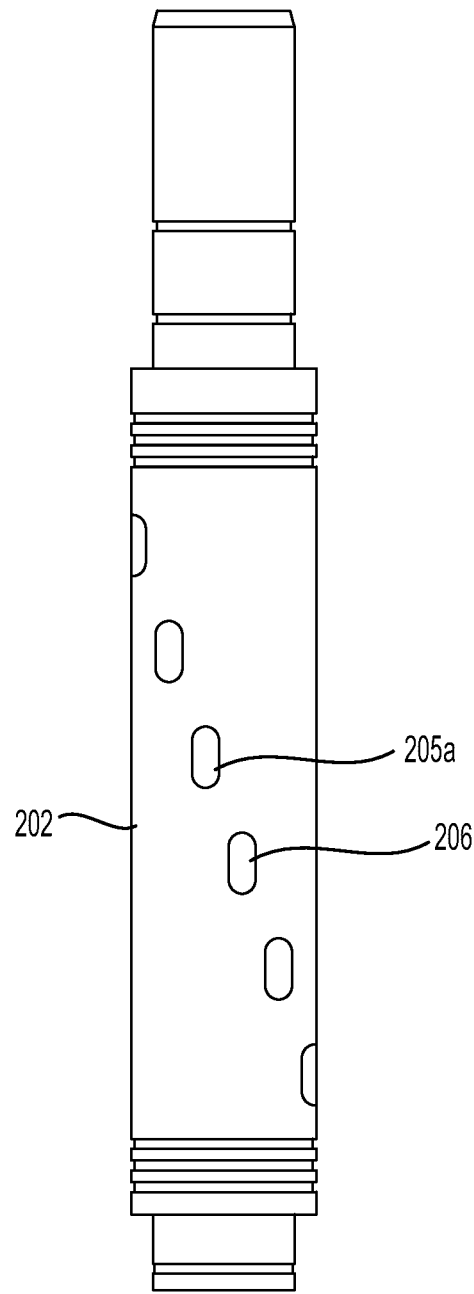
FIG. 2G illustrates a side view of an example spool.

FIG. 2G illustrates a side view of example spool 202. Referring to FIG. 2G, in one example, the spool 202 may comprise the plurality of selector openings 205a and 206 configured as through-holes and positioned in a helical manner along the external surface of the spool 202. In another example, the number of selector openings at each axial location along the spool may be increased (and the port width decreased) thus providing the same functionality with less rotational movement of the spool. A reduction in rotational movement will result in a reduction in time and power needed to operate the valve 200. By way of example, there are other layouts which may provide similar valve logic as shown in FIG. 2G.

Figure 3:
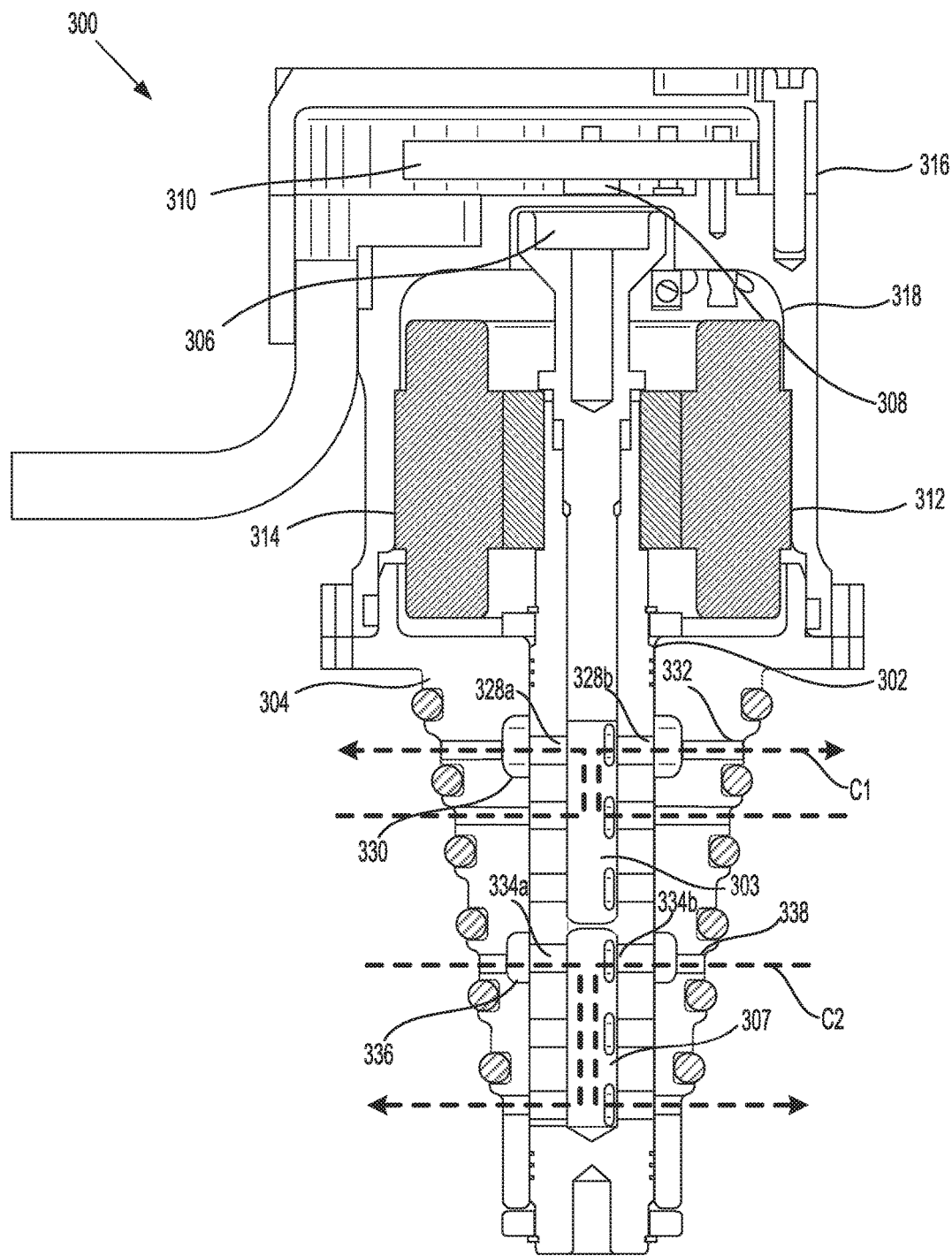
FIG. 3 illustrates a cross-sectional view of a rotary valve with dual output ports.

FIG. 3 illustrates a cross-sectional view of a rotary valve 300 with dual output ports. The rotary valve 300 comprises a spool 302 and a sleeve 304 for receiving the spool 302. The rotary valve 300 comprises a position sense magnet 306 and a sensor 308. A controller 310 is shown in FIG. 3. The rotary valve 300 comprises a stator assembly 312 coupled to the sleeve 304 and a rotor 314 coupled to the spool 302. The rotary valve 300 also comprises a housing 316.

The sensor 308 is configured to receive the information indicative of the relative position of the spool 302 within the sleeve 304 based on the magnetic field associated with the position sense magnet 306. By way of example, the sensor 308 may be coupled to the housing 316.

The controller 310 is configured to receive the information indicative of the relative position of the spool 302 within the sleeve 304. The controller 310 is configured to determine a given rotational movement of the spool 302 within the sleeve 304 based on the relative position of the spool 302 within the sleeve 304. The given rotational movement may correspond to a selection of one of the plurality of pressurized fluids.

A stator assembly 312 coupled to the sleeve 304 is shown in FIG. 3. The rotary valve 300 also includes a rotor 314 coupled to the spool 302. The rotor 314 is configured to rotate the spool 302 within the sleeve 304 based on the given rotational movement and through the use of the stator assembly 312. In one example, the stator assembly 312 and rotor 314 may be implemented as a frameless motor in order to reduce the size and number of parts needed.

Referring to FIG. 3, the housing 316 may be configured to enclose the stator assembly 312 and a portion of the spool 302 that extends away from the sleeve 304. In one example, the housing 316 may comprise aluminum, steel, or a non-magnetic steel and have a length of about 40 mm. The housing 316 may be configured to prevent contaminants from reaching the various subcomponents of the rotary valve 300.

The spool 302 may comprise a first internal chamber 303 and a second internal chamber 307 as shown in FIG. 3. The first internal chamber 303 communicates through control openings 328a and 328b to undercut 330 and control output holes 332 to C1. Similarly, the second internal chamber 307 communicates through control openings 334a and 334b to undercut 336 and control output holes 338 to output C2. In this example, rotation of the spool 302 within the sleeve 304 allows alignment between the spool 302 and the sleeve 304. In this example, outputs C1 and C2 could be used to drive a bi-directional hydraulic actuator, e.g. a double-acting hydraulic cylinder.

Figure 4A:
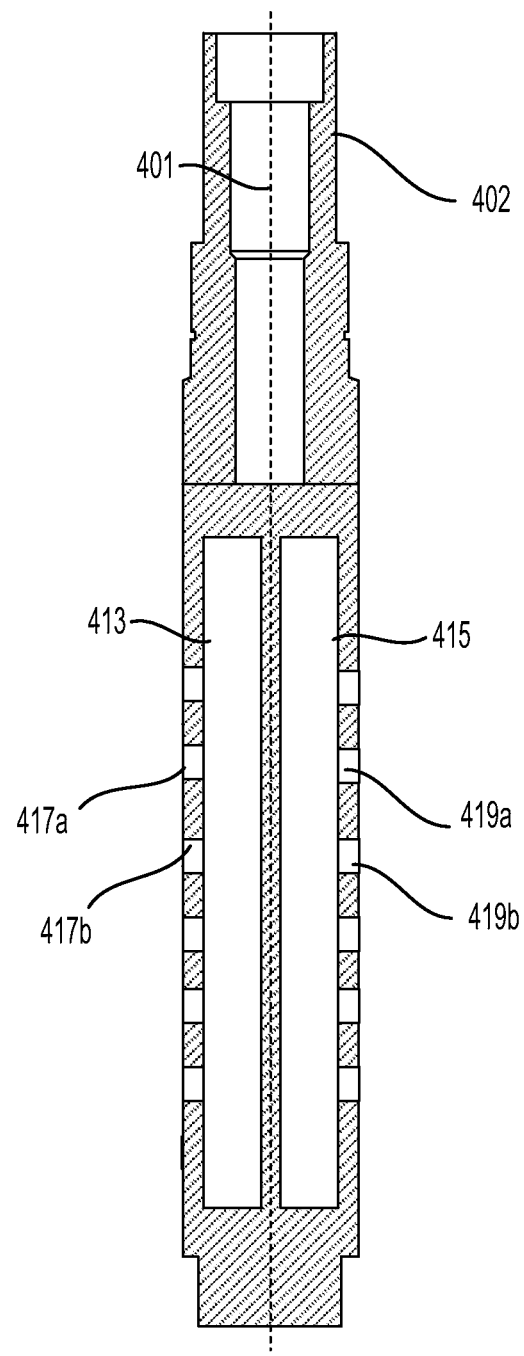
FIGS. 4A and 4B illustrate example cross-sectional view of another spool.
Figure 4B:
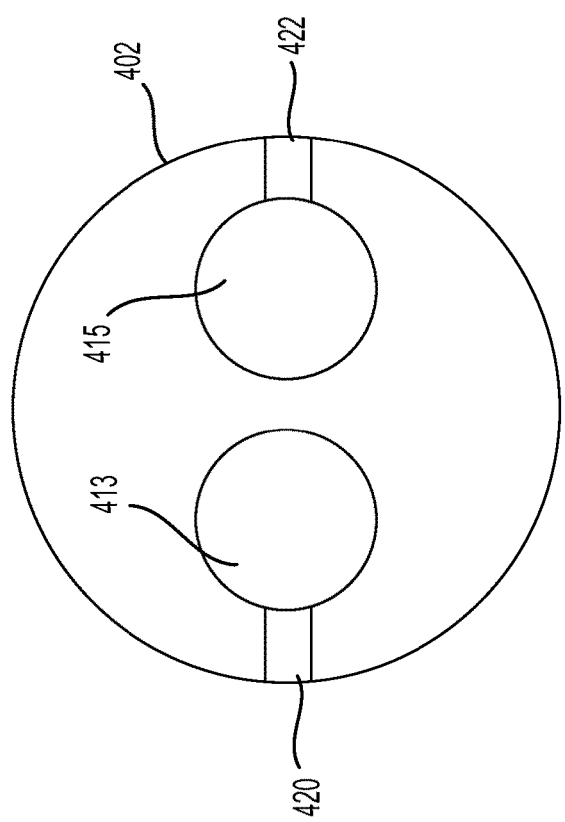

FIGS. 4A and 4B illustrate cross-sectional views of an example spool 402.

Referring to FIG. 4A, in one example, the spool 402 may comprise a plurality of internal chambers 413 and 415. The first chamber 413 and the second chamber 415 divide a hollow portion of the spool 402 along a longitudinal axis 401 of the spool 402. By way of example, it may be possible to have a different port layout associated with the first chamber 413 and the second chamber 415.

The spool 402 may comprise a plurality of selector openings that include a first set of selector openings 417a and 417b arranged as through-holes at given heights along the external surface of the spool 402. The first set of selector openings 417a and 417b are configured to allow a pressurized fluid to flow to the first chamber 413. A second set of selector openings 419a and 419b arranged as through-holes at given heights along the external surface of the spool 402 allow the pressurized fluid to flow to the second chamber 415.

FIG. 4B illustrates a top view of the spool 402. Referring to FIG. 4B, a first selector opening 420 is spaced apart at an offset of about 180° along a circumference of the spool 402 from a second selector opening 422. The first selector opening 420 is coupled to first internal chamber 413. The second selector opening 422 is coupled to second internal chamber 415.

Figure 5:
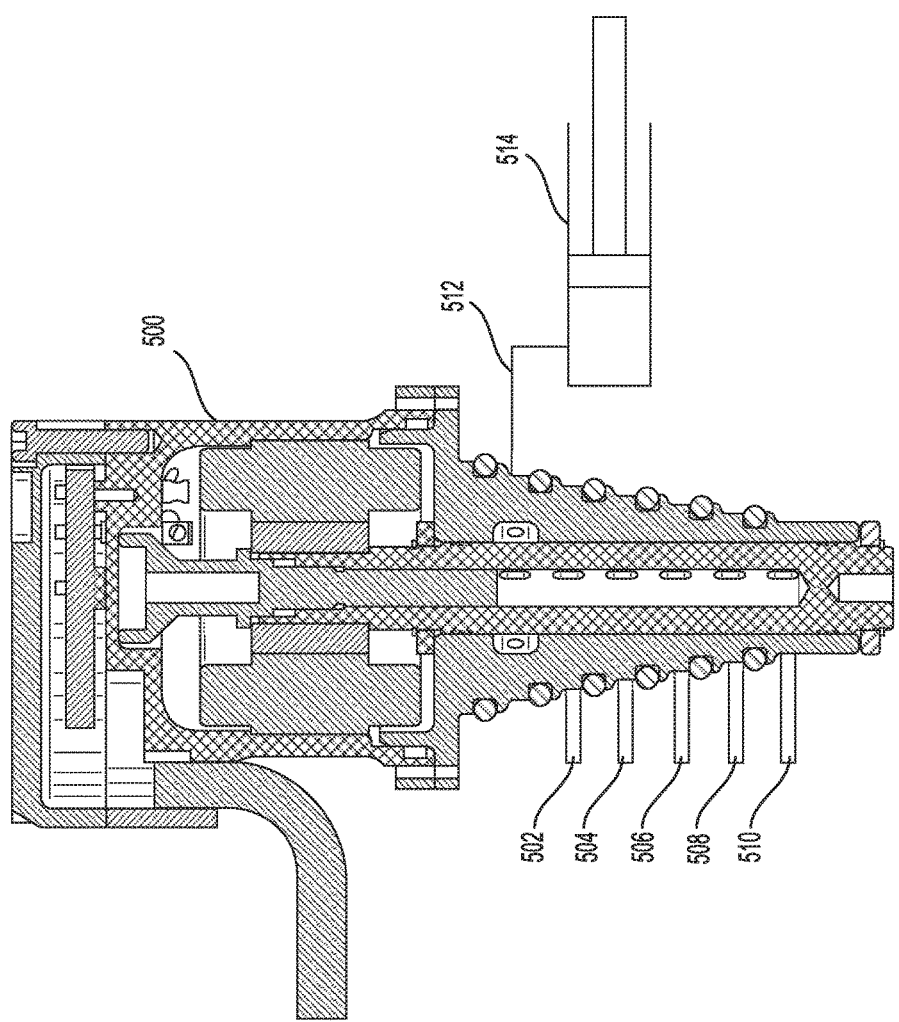
FIG. 5 illustrates a cross-sectional view of another example rotary valve.

FIG. 5 illustrates a cross-sectional view of an example rotary valve 500. Referring to FIG. 5, the rotary valve 500 is coupled to a plurality of pressure rails 502, 504, 506, 508, and 510. The rotary valve 500 is coupled to a hydraulic cylinder 514.

The rotary valve 500 is coupled to a plurality of pressure rails 502, 504, 506, 508, and 510 comprising a plurality of pressurized fluids at various pressure levels. The various pressure levels may be configured based on a specific application associated with the rotary valve 500. As one example, the pressure levels may increase sequentially from top to bottom or from bottom to top. In another example, the pressure levels may be any magnitude at any order, and can be specifically organized for a particular use of the valve 500.

In one example, the rotary valve 500 may be coupled to the hydraulic cylinder 514 through a fluid line 512. Based on a selection of a given pressurized fluid of the plurality of pressurized fluids, the rotary valve 500 may enable the given pressurized fluid to flow from a given pressure rail through the rotary valve 500 to the hydraulic cylinder 514 in order to cause the hydraulic cylinder 514 to move with a given force based on a given pressure level associated with the given pressurized fluid.

By way of example, a signal corresponding to a selection of the given pressurized fluid may be received within a controller. The controller may be configured to determine the rotational movement necessary to enable selection of the given pressurized fluid based on information indicating a position of a spool within a sleeve that may be received from an exemplary encoder. In this example, the controller may be configured to provide a signal corresponding to the required rotational movement to a motor in order to position the spool within the sleeve and enable selection of the given pressurized fluid.

Figure 6:
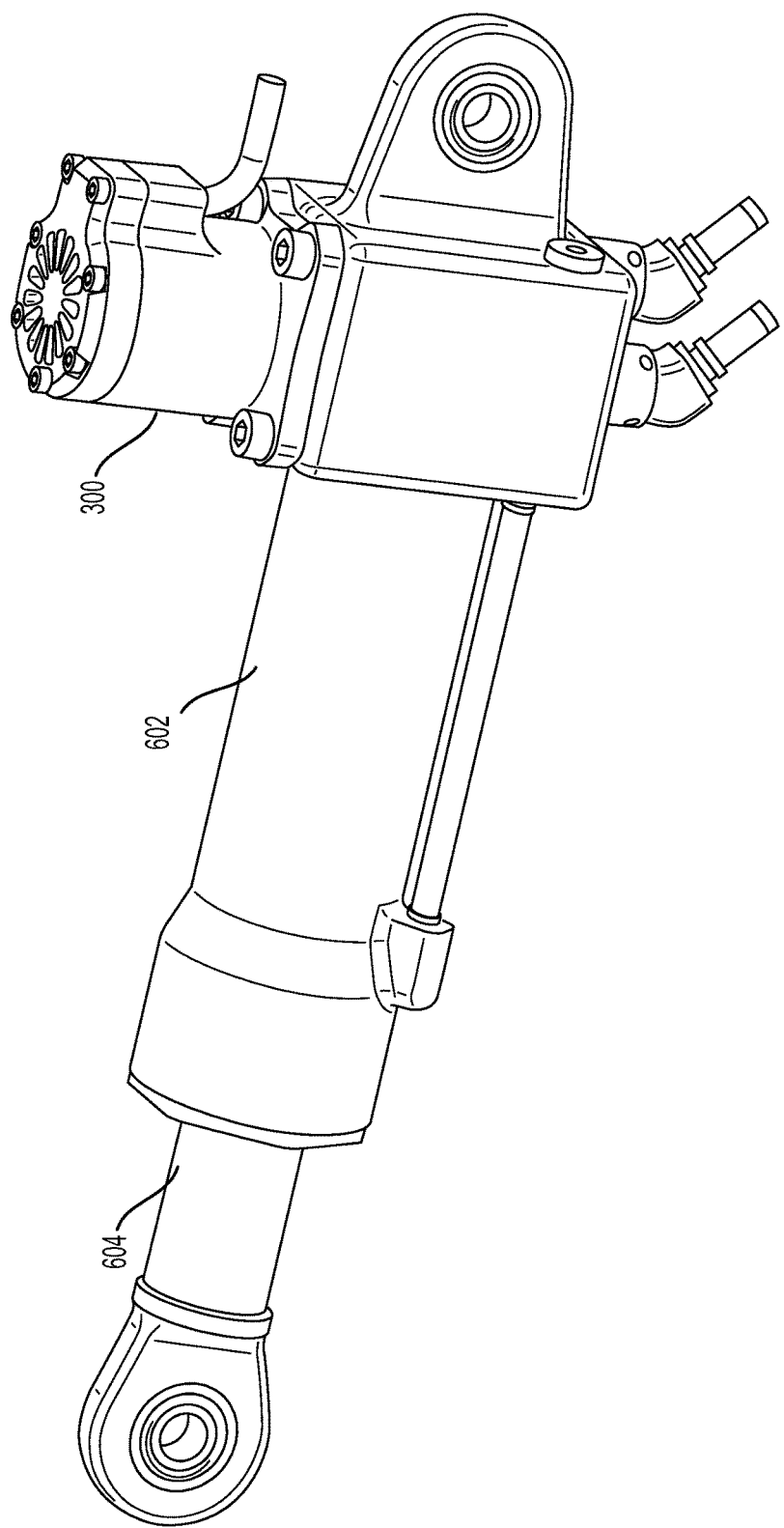
FIG. 6 illustrates a side view of an example actuator with an integrated rotary valve.

FIG. 6 illustrates a side view of an example actuator with an integrated rotary valve. Referring to FIG. 6, the rotary valve 300 from FIG. 3 is integrated with an actuator 602. Based on the selection of a given pressurized fluid, the rotary valve 300 enables a sliding member 604 to move back and forth based on a desired movement.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A rotary valve comprising:
    a sleeve with a plurality of selector ports and a control port spaced along a length of the sleeve, wherein a first one of the selector ports is an input for a first pressurized fluid having a first pressure level and a second one of the selector ports is an input for a second pressurized fluid having a second pressure level, the first pressure level greater than the second pressure level;
    a spool provided within the sleeve, the spool comprising an internal chamber, the spool including a plurality of selector openings and one or more control openings spaced along a length of the spool, wherein the plurality of selector openings and the one or more control openings provide access to the internal chamber, wherein a first one of the selector openings corresponds to the first one of the selector ports and the second one of the selector openings corresponds to the second one of the selector ports according to a given axial position of the sleeve, the plurality of selector openings comprising a radially pressure-balanced array of selector openings;
    a controller for controlling a rotational movement of the spool that results in a selection of the first pressurized fluid or the second pressurized fluid; and
    a motor coupled to the spool, and for rotating the spool within the sleeve to cause at least a partial overlap between the first one of the plurality of selector openings and the first one of the plurality of selector ports, wherein the partial overlap creates a pathway through the internal chamber of the spool and out to the sleeve.

2. The rotary valve of claim 1, wherein the spool further comprises a plurality of ribs positioned along an external surface of the spool for maintaining a separation between the spool and the sleeve.

3. The rotary valve of claim 1, wherein the controller is configured to cause alignment between a given selector opening of the spool and a given selector port of the sleeve in a manner that enables a continuous wrap-around rotation to transition alignment of the given selector opening of the spool between the first selector port associated with the first pressurized fluid to the second selector port associated with the second pressurized fluid.

4. The rotary valve of claim 1, further comprising a sensor configured to provide information indicative of a rotational position of the spool within the sleeve.

5. A rotary valve comprising:
    a sleeve with a plurality of selector ports and a control port spaced along a length of the sleeve, wherein a first one of the selector ports is an input for a first pressurized fluid having a first pressure level and a second one of the selector ports is an input for a second pressurized fluid having a second pressure level, the first pressure level greater than the second pressure level;
    a spool provided within the sleeve, the spool comprising an internal chamber, the spool including a plurality of selector openings and one or more control openings spaced along a length of the spool, wherein the plurality of selector openings and the one or more control openings provide access to the internal chamber, wherein a first one of the selector openings corresponds to the first one of the selector ports and the second one of the selector openings corresponds to the second one of the selector ports according to a given axial position of the sleeve, wherein the plurality of selector openings are staggered about 90° according to axial positions of the plurality of selector openings;
    a controller for controlling a rotational movement of the spool that results in a selection of the first pressurized fluid or the second pressurized fluid; and
    a motor coupled to the spool, and for rotating the spool within the sleeve to cause at least a partial overlap between the first one of the plurality of selector openings and the first one of the plurality of selector ports, wherein the partial overlap creates a pathway through the internal chamber of the spool and out to the sleeve.

6. A rotary valve comprising:
    a spool including a plurality of internal chambers and a plurality of selector openings along an external surface, wherein the plurality of selector openings are configured to allow a pressurized fluid of a plurality of pressurized fluids each having a different pressure level to flow through a given internal chamber of the plurality of internal chambers;
    a sleeve comprising a plurality of selector ports and for receiving the spool, wherein the plurality of selector ports are arranged to be assigned to sequentially decreasing pressurized fluid based on a plurality of axial positions;
    a position sense magnet coupled to the spool;

a sensor configured to provide information indicative of a relative position of the spool within the sleeve based on a magnetic field of the position sense magnet;
a controller configured to receive the information indicative of the relative position of the spool within the sleeve and to control a given rotational movement of the spool within the sleeve based on a desired selection of one of the plurality of pressurized fluids and the relative position of the spool within the sleeve;
a stator assembly coupled to the sleeve; and
a rotor coupled to the spool, wherein the rotor is configured to rotate the spool within the sleeve based on the given rotational movement and through the use of the stator assembly.

7. The rotary valve of claim 6, further comprising a housing configured to enclose the stator assembly and a portion of the spool that extends away from the sleeve.

8. The rotary valve of claim 7, wherein the housing comprises an enclosed chamber including fluid and for receiving the stator assembly and the portion of the spool that extends away from the sleeve.

9. The rotary valve of claim 6, wherein a first selector opening of the plurality of selector openings is spaced apart at an offset of about 180° along a circumference of the spool from a second selector opening of the plurality of selector openings, wherein the first selector opening and the second selector opening are positioned at a same height along a longitudinal axis of the spool.

10. The rotary valve of claim 6, wherein the plurality of selector openings along the external surface of the spool are positioned in a spiral configuration.

11. The rotary valve of claim 10, wherein the plurality of selector ports positioned along a longitudinal axis of the sleeve are spaced apart in a vertical manner.

12. A rotary valve comprising:
a sleeve including:
a control port disposed at a first axial position of the sleeve and providing communication between an internal bore of the sleeve and an output of the rotary valve,
a first selector port disposed at a second axial position of the sleeve, and providing fluid communication between the internal bore and a first pressurized fluid having a first pressure level, and
a second selector port disposed at a third axial position of the sleeve, and providing fluid communication between the internal bore and a second pressurized fluid having a second pressure level,
wherein the sleeve has a first diameter at the first axial position, a second diameter at the second axial position, and a third diameter at the third axial position, each of the diameters being different from the others; and
a spool rotatably received within the internal bore of the sleeve, the spool including a control opening axially aligned with the control port, a first selector opening axially aligned with the first selector port, and a second selector opening axially aligned with the second selector port, each of the control opening, the first selector opening, and the second selector opening in fluid communication with an internal chamber of the spool, wherein the spool is operable to selectively provide one of the first pressurized fluid and the second pressurized fluid to the control port.

13. The rotary valve of claim 12, wherein the second axial position is intermediate the first axial position and the third axial position, and wherein the first diameter is greater than the second diameter, and the second diameter is greater than the third diameter.

14. The rotary valve of claim 12, wherein the control opening, the first selector opening, and the second selector opening are aligned along a longitudinal direction of the spool.

15. The rotary valve of claim 12, wherein the output of the rotary valve is disposed within a first channel, the first selector port is disposed within a second channel, and the second selector port is disposed within a third channel.

16. The rotary valve of claim 15, wherein each of the first channel, the second channel, and the third channel is defined by a pair of axially spaced seals.

17. A rotary valve comprising:
a sleeve including:
a control port disposed at a first axial position of the sleeve and providing communication between an internal bore of the sleeve and an output of the rotary valve,
a first selector port disposed at a second axial position of the sleeve, and providing fluid communication between the internal bore and a first pressurized fluid having a first pressure level, and
a second selector port disposed at a third axial position of the sleeve, and providing fluid communication between the internal bore and a second pressurized fluid having a second pressure level,
wherein when the sleeve is in a first rotational position, the first pressurized fluid is provided from the first selector port to the control port, and when the sleeve is in a second rotational position, the second pressurized fluid is provided from the second selector port to the control port; and
a spool rotatably received within the internal bore of the sleeve, the spool including a control opening axially aligned with the control port, a first selector opening axially aligned with the first selector port, and a second selector opening axially aligned with the second selector port, each of the control opening, the first selector opening, and the second selector opening in fluid communication with an internal chamber of the spool, wherein the spool is operable to selectively provide one of the first pressurized fluid and the second pressurized fluid to the control port.

18. A rotary valve comprising:
a sleeve including:
a control port disposed at a first axial position of the sleeve and providing communication between an internal bore of the sleeve and an output of the rotary valve,
a first selector port disposed at a second axial position of the sleeve, and providing fluid communication between the internal bore and a first pressurized fluid having a first pressure level, and
a second selector port disposed at a third axial position of the sleeve, and providing fluid communication between the internal bore and a second pressurized fluid having a second pressure level; and
a spool rotatably received within the internal bore of the sleeve, the spool defining a longitudinal axis and including a control opening axially aligned with the control port, a first selector opening axially aligned with the first selector port, and a second selector opening axially aligned with the second selector port, each of the control opening, the first selector opening, and the second selector opening in fluid communication with an internal chamber of the spool, wherein the spool is operable to selectively provide one of the first pressurized fluid and the second pressurized fluid to the control port, wherein the selector openings are configured as through-holes at given heights along the longitudinal axis of the spool, and the through-holes are provided at offsets with respect to each other of about 120° or about 180° along a circumference of the spool.

* * * * *